United States Patent
Tian et al.

(10) Patent No.: US 11,868,557 B2
(45) Date of Patent: Jan. 9, 2024

(54) TOUCH SUBSTRATE AND MANUFACTURING METHOD THEREOF

(71) Applicants: Hefei Xinsheng Optoelectronics Technology Co., Ltd., Anhui (CN); BOE TECHNOLOGY GROUP CO., LTD., Beijing (CN)

(72) Inventors: Jian Tian, Beijing (CN); Xiaohui Yang, Beijing (CN); Jie Lei, Beijing (CN); Zouming Xu, Beijing (CN); Xiaofeng Yin, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 17/631,584

(22) PCT Filed: Apr. 23, 2021

(86) PCT No.: PCT/CN2021/089263
§ 371 (c)(1),
(2) Date: Jan. 31, 2022

(87) PCT Pub. No.: WO2021/238530
PCT Pub. Date: Dec. 2, 2021

(65) Prior Publication Data
US 2022/0283688 A1  Sep. 8, 2022

(30) Foreign Application Priority Data
May 26, 2020  (CN) .......................... 202010460605.4

(51) Int. Cl.
*G06F 3/041* (2006.01)

(52) U.S. Cl.
CPC ........ *G06F 3/04164* (2019.05); *G06F 3/0412* (2013.01); *G06F 2203/04103* (2013.01);
(Continued)

(58) Field of Classification Search
CPC . G06F 3/041–0412; G06F 3/044–0448; G06F 2203/041–04114; G06F 3/04164; H10K 59/40; H10K 59/131
See application file for complete search history.

(56) References Cited

U.S. PATENT DOCUMENTS

| 2016/0170524 A1* | 6/2016 | Kim | G06F 3/0446 |
| | | | 345/174 |
| 2019/0235702 A1* | 8/2019 | Wang | G06F 3/0445 |

FOREIGN PATENT DOCUMENTS

| CN | 103870044 A * | 6/2014 | .......... G06F 3/0416 |
| CN | 106468972 A | 3/2017 | |

(Continued)

*Primary Examiner* — Sanjiv D. Patel
(74) *Attorney, Agent, or Firm* — HOUTTEMAN LAW LLC (57) ABSTRACT

The present disclosure provides a touch substrate and a manufacturing method thereof. The touch substrate includes a base substrate and a touch electrode structure in a display area of the base substrate, and further includes a conductive structure and a wiring structure, wherein the conductive structure is in a peripheral area of the base substrate outside the display area, and includes a one-piece layer which is configured to form a lead electrically connected to a driving circuit for the touch electrode structure; and the wiring structure is in a wiring area between the display area and the peripheral area of the base substrate and is configured to electrically connect the conductive structure to the touch electrode structure. With the touch substrate and the manufacturing method of the touch substrate, problems of poor alignment and lapping, increased contact impedance, insufficient adhesive force and the like can be solved.

20 Claims, 5 Drawing Sheets

(52) U.S. Cl.
CPC .............. *G06F 2203/04111* (2013.01); *G06F 2203/04112* (2013.01)

(56) References Cited

FOREIGN PATENT DOCUMENTS

| | | |
|---|---|---|
| CN | 107678596 A | 2/2018 |
| CN | 108415601 A | 8/2018 |
| CN | 109407869 A | 3/2019 |
| CN | 111625143 A | 9/2020 |
| EP | 3316103 A1 | 5/2018 |

\* cited by examiner

TOUCH SUBSTRATE AND MANUFACTURING METHOD THEREOF

CROSS REFERENCE TO RELATED APPLICATIONS

The present application claims the priority of the Chinese Patent Application No. 202010460605.4 filed on May 26, 2020, the content of which is incorporated herein by reference in its entirety.

TECHNICAL FIELD

The present disclosure relates to the field of display technology, and in particular to a touch substrate and a manufacturing method thereof.

BACKGROUND

With the rapid development of display technology, touch screen panels have gradually come throughout the lives of people. Moreover, due to the requirement of large-screen display, there are a large number of tiled display applications in the market at present. The large-size tiled touch screen is manufactured by two main processes: the first process is a yellow light exposure process; the second process is a roll-to-roll process. Such the two processes may be used for manufacturing the large-size tiled touch screen with better performance.

SUMMARY

The present disclosure provides a touch substrate, including a base substrate and a touch electrode structure in a display area of the base substrate, the touch substrate further includes a conductive structure and a wiring structure, wherein the conductive structure is in a peripheral area of the base substrate outside the display area, and includes at least one conductive layer, and the at least one conductive layer includes a one-piece layer which is configured to form a lead electrically connected to a driving circuit;

the wiring structure is in a wiring area between the display area and the peripheral area of the base substrate and is configured to electrically connect the conductive structure with the touch electrode structure.

In one embodiment, the touch electrode structure includes two touch electrode layers (that is, a first touch electrode layer and a second touch electrode layer) sequentially arranged along a direction away from the base substrate; the touch substrate further includes a first insulating protection layer and a second insulating protection layer, the first insulating protection layer is between the two touch electrode layers, the second insulating protection layer is on the second touch electrode layer, and the first insulating protection layer and the second insulating protection layer are in the display area and a part of the wiring area;

the conductive layer includes two conductive layers (that is, a first conductive layer and a second conductive layer) which are sequentially stacked along the direction away from the base substrate, the wiring structure includes two wiring layers (that is, a first wiring layer and a second wiring layer) sequentially arranged along the direction away from the base substrate, and the first wiring layer is on the base substrate and is configured to electrically connect the first conductive layer to the first touch electrode layer; the second wiring layer is on the first insulating protection layer and is configured to electrically connect the second conductive layer to the second touch electrode layer.

In one embodiment, both the two touch electrode layers are in a mesh shape.

In one embodiment, the first conductive layer and/or the second conductive layer includes an indium tin oxide layer or a nano silver layer.

In one embodiment, the at least one conductive layer includes a conductive layer which is the one-piece layer; the touch electrode structure includes a plurality of first electrodes and a plurality of second electrodes; each of the first electrodes includes a plurality of first electrode units; each of the second electrodes includes a plurality of second electrode units; every two adjacent first electrode units are connected to each other through a first bridging portion; every two adjacent second electrode units are connected to each other through a second bridging portion; each first bridging portion and the corresponding second bridging portion intersect with each other, and the touch electrode structure further includes an insulating layer at the intersection between the first bridging portion and the corresponding second bridging portion;

the wiring structure includes a plurality of first wirings and a plurality of second wirings, wherein the plurality of first wirings are configured to electrically connect the plurality of first electrodes to the conductive layer, respectively; the plurality of second wires are configured to electrically connect the plurality of second electrodes to the conductive layer, respectively; and the touch substrate further includes a plurality of insulating protection layers, and each insulating protection layer at least covers a corresponding first bridging portion, a corresponding second bridging portion and the insulating layer between the corresponding first bridging portion and the corresponding second bridging portion.

In one embodiment, the conductive layer includes an indium tin oxide layer or a nano silver layer.

In one embodiment, the touch substrate further includes a peelable protection layer covering the display area, the peripheral area, and the wiring area of the base substrate and on a side of the base substrate with the touch electrode structure.

In one embodiment, the peelable protection layer includes a first adhesive segment covering the display area of the base substrate and a second adhesive segment covering the wiring area and the peripheral area of the base substrate; the first adhesive segment and the second adhesive segment are separated from each other.

The present disclosure also provides a method for manufacturing a touch substrate, including steps of:

forming a touch electrode structure in a display area of a base substrate;

forming a conductive structure in a peripheral area outside the display area of the base substrate;

forming a wiring structure in a wiring area of the base substrate between the display area and the peripheral area;

wherein the conductive structure includes at least one conductive layer, the at least one conductive layer includes a one-piece layer which is configured to form a lead electrically connected to a driving circuit for the touch electrode structure; the wiring structure is configured to electrically connect the conductive structure to the touch electrode structure.

In one embodiment, the method specifically includes steps of:
- forming a first touch electrode layer, a first conductive layer and a first wiring layer in the display area, the peripheral area and the wiring area of the base substrate, through a single patterning process, respectively; wherein the first wiring layer is configured to electrically connect the first conductive layer to the first touch electrode layer;
- forming a first insulating protection layer on the first touch electrode layer, wherein the first insulating protection layer covers the display area and a part of the wiring area;
- forming a second touch electrode layer, a second conductive layer and a second wiring layer on the first insulating protection layer and in the display area, the peripheral area and the wiring area, through a single patterning process, respectively; wherein the second wiring layer is configured to electrically connect the second conductive layer to the second touch electrode layer;
- forming a second insulating protection layer on the second touch electrode layer, wherein the second insulating protection layer covers the display area and a part of the wiring area,
- wherein the first touch electrode layer and the second touch electrode layer form the touch electrode structure, the first conductive layer and the second conductive layer form the conductive structure, and the first wiring layer and the second wiring layer form the wiring structure; and
- at least one of the first and second conductive layers is the one-piece layer.

In one embodiment, the first conductive layer and/or the second conductive layer includes an indium tin oxide layer or a nano silver layer.

In one embodiment, the method specifically includes steps of:
- forming a touch electrode layer in the display area of the base substrate, wherein the touch electrode layer includes a plurality of first electrodes, a plurality of second electrodes and a plurality of first bridging portion; wherein each first electrode includes a plurality of first electrode units; each second electrode includes a plurality of second electrode units; every two adjacent first electrode units are connected to each other through a corresponding first bridging portion;
- forming an insulating layer on each first bridging portion;
- forming a second bridging portion on each insulating layer and at a position where the second bridging portion and the corresponding first bridging portion intersect with each other, and forming a wiring layer and a conductive layer in the wiring area and the peripheral area of the base substrate; wherein each of the second bridging portions connects two corresponding adjacent second electrode units, through a single patterning process; the wiring layer includes a plurality of first wirings and a plurality of second wirings, and the plurality of first wirings are configured to electrically connect the plurality of first electrodes to the conductive layer, respectively; the plurality of second wirings are configured to electrically connect the plurality of second electrodes to the conductive layer, respectively;
- forming a plurality of insulating protection layers in the display area of the base substrate, wherein each insulating protection layer at least covers a corresponding first bridging portion, a corresponding second bridging portion and the insulating layer between the corresponding first bridging portion and the corresponding second bridging portion,
- wherein the touch electrode layer forms the touch electrode structure, the conductive layer forms the conductive structure, and the wiring layer forms the wiring structure; and
- the conductive layer is the one-piece layer.

In one embodiment, the plurality of first electrodes and the plurality of second electrodes are in a same layer.

In one embodiment, the method further includes forming a peelable protection layer in the display area, the peripheral area, and the wiring area of the base substrate and on a side of the base substrate where the touch electrode structure is provided.

The present disclosure has the following beneficial effects:

In the technical solution for a touch substrate and the manufacturing method of a touch substrate of the present disclosure, the conductive layer is arranged in the peripheral area outside the display area of the base substrate, the wiring area of the base substrate between the display area and the peripheral area is provided with the wiring layer configured to electrically connect the conductive layer and the touch electrode layer. Since the conductive layer is a one-piece layer (e.g., a whole layer without any pattern design), when positions of the PIN outgoing line needs to be adjusted, the one-piece layer may be processed to obtain a wiring structure adapted to the needs (meeting the requirements), so that the positions of the wirings may be secondarily adjusted without newly setting up a mask. In this way, the development cost is reduced and the feasibility is improved. In addition, the conductive layer and the touch electrode layer are electrically connected to each other through the wiring layer, and alignment processing is not needed to be performed on conductive materials in the display area and the wiring area. In this way, the problems of poor alignment and lapping, increased contact impedance, insufficient adhesive force and the like may be solved.

DETAIL DESCRIPTION OF EMBODIMENTS

To enable one of ordinary skill in the art to better understand technical solutions of the present disclosure, a touch substrate and a manufacturing method thereof provided by the present disclosure will be described in detail below with reference to the accompanying drawings.

The inventor of the present disclosure has found in the process of research that in a yellow light exposure process, due to the limitation of a size of a mask, a plurality of touch screens cannot be simultaneously manufactured through a single exposure process, which requires that touch screens are manufactured separately and then spliced to form a complete screen. However, in different complete screen designs, requirements for positions of Pin outgoing line (external pin) of the touch screens may be different. When the Pin outgoing line positions need to be changed, a mask needs to be newly set up during a conventional exposure process, resulting in a higher development cost and a lower feasibility of a scheme.

For the roll-to-roll process, because a display area and a wiring area are made of different conductive materials, alignment processing is required, easily resulting in problems of poor alignment and lapping (overlapping), increased contact impedance, insufficient adhesive force and the like.

Figure 1:
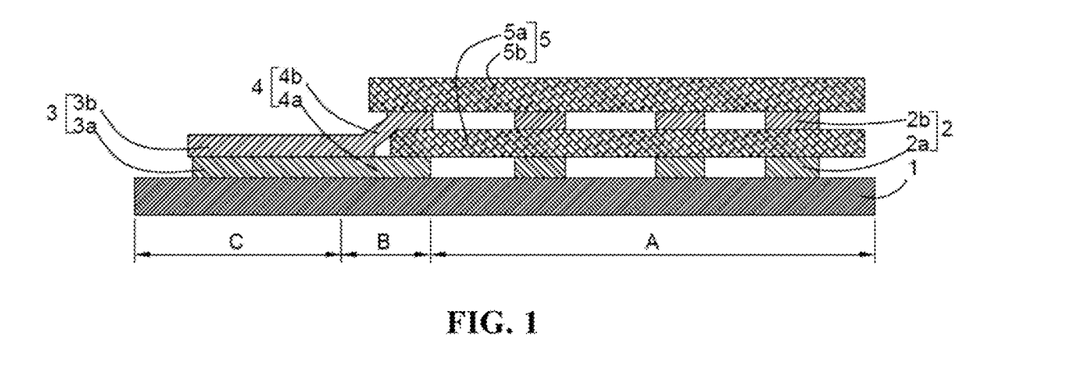
FIG. 1 is a cross-sectional view of a part of a touch substrate in an embodiment of the present disclosure.
Figure 2A:
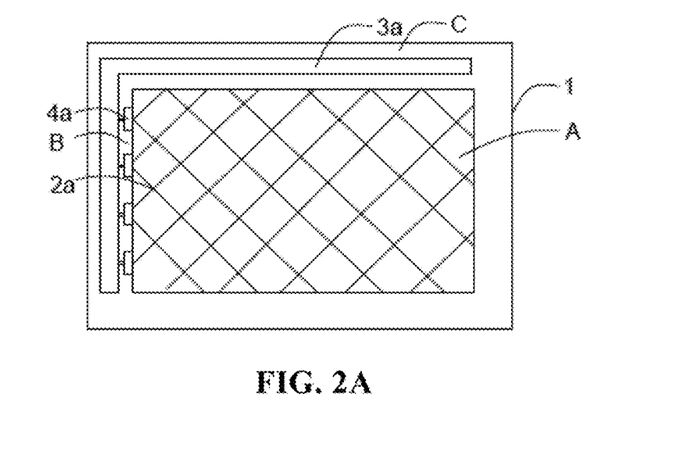
FIG. 2A is a structural diagram of a first touch electrode layer in an embodiment of the present disclosure.
Figure 2B:
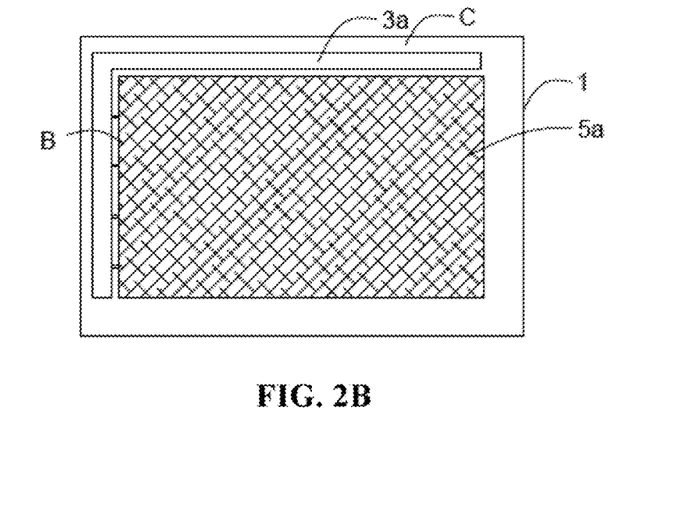
FIG. 2B is a structural diagram of a first insulating protection layer in an embodiment of the present disclosure.
Figure 2C:
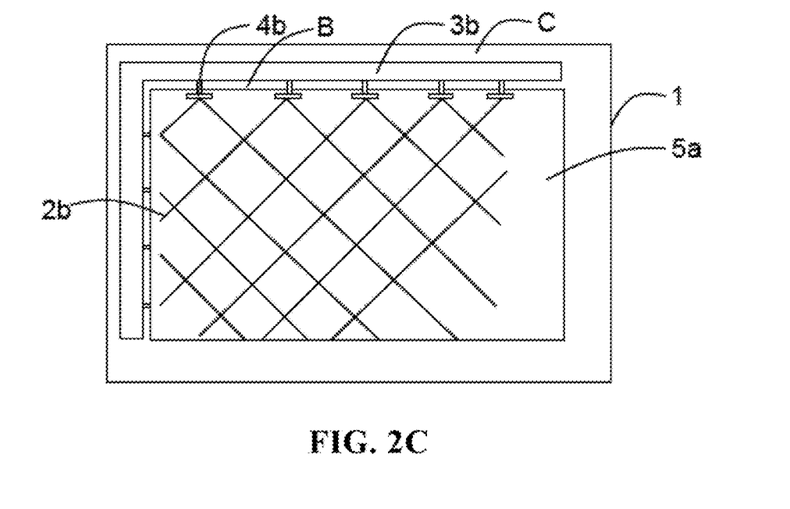
FIG. 2C is a structural diagram of a second touch electrode layer in an embodiment of the present disclosure.
Figure 2D:
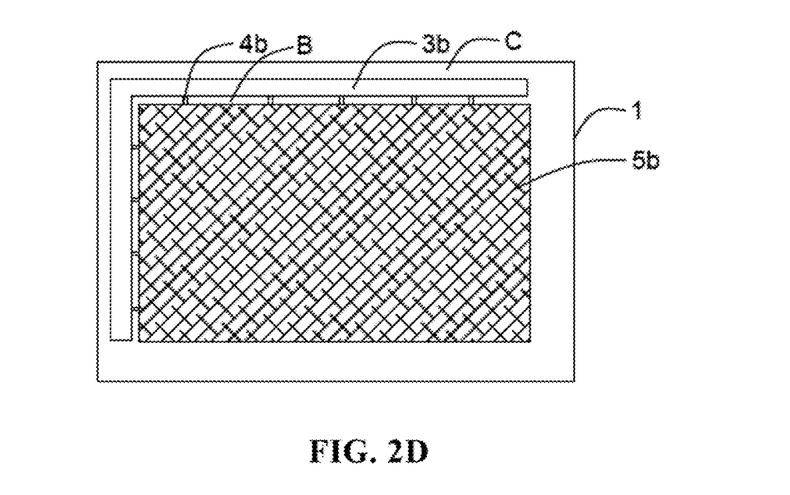
FIG. 2D is a structural diagram of a second insulating protection layer in an embodiment of the present disclosure.

Referring to FIGS. 1 to 2D, a touch substrate in an embodiment of the present disclosure includes a base substrate 1 and a touch electrode structure 2 disposed in a display area A of the base substrate 1, wherein the touch electrode structure 2 includes two layers, i.e., a first touch electrode layer 2a and a second touch electrode layer 2b sequentially disposed along a direction away from the base substrate 1. The first touch electrode layer 2a and the second touch electrode layer 2b function as a sensing electrode and a driving electrode, respectively, both of which are, for example, in a mesh shape.

The touch substrate further includes a conductive structure 3 and a wiring structure 4, wherein the conductive structure 3 is disposed in a peripheral area C outside the display area A of the base substrate 1. In this embodiment, the conductive structure 3 includes two layers, including a first conductive layer 3a and a second conductive layer 3b sequentially stacked along the direction away from the base substrate 1. Each of the first conductive layer 3a and the second conductive layer 3b is a one-piece layer, for example, a whole layer without any pattern design, for manufacturing wirings electrically connected to the driving circuit. For example, the wirings 3b' shown in FIG. 3 may be manufactured from the second conductive layer 3b.

In one embodiment, the first conductive layer 3a and/or the second conductive layer 3b includes an indium tin oxide layer (ITO layer) or a nano silver layer.

The touch substrate further includes an insulating protection layer 5, which is two layers, i.e., a first insulating protection layer 5a and a second insulating protection layer 5b. The first insulating protection layer 5a is arranged between the first touch electrode layer 2a and the second touch electrode layer 2b; the second insulating protection layer 5b is disposed on the second touch electrode layer 2b, and the first insulating protection layer 5a and the second insulating protection layer 5b both cover the display area A and a portion of a wiring area B, and are configured to protect and insulate the lower touch electrode layer and a portion of a wiring layer. For example, a portion of the wiring area B covered by the insulating protection layer 5 is an area where the wiring layer and the touch electrode layer are bonded to each other, and the area is an area of the wiring area B close to the display area A.

The wiring layer 4 is disposed in the wiring area B of the base substrate 1 between the display area A and the peripheral area C, and is configured to electrically connect the conductive layer 3 to the touch electrode layer 2. In this embodiment, the wiring layer includes two layers, namely a first wiring layer 4a and the second wiring layer 4b sequentially arranged in the direction away from the base substrate 1. The first wiring layer 4a is disposed on the base substrate 1, and is configured to electrically connect the first conductive layer 3a to the first touch electrode layer 2a; the second wiring layer 4b is disposed on the first insulating protection layer 5a, and is configured to electrically connect the second conductive layer 3b to the second touch electrode layer 2b.

Since the conductive layer 3 is a one-piece layer (e.g., a whole layer without any pattern design), when positions of the PIN outgoing line (e.g., the wirings 3b' shown in FIG. 3) needs to be adjusted, the one-piece layer may be processed to obtain a wiring structure adapted to the needs (meeting the requirements), so that the positions of the wirings may be secondarily adjusted without newly setting up a mask. In this way, the development cost is reduced and the feasibility is improved. In addition, the conductive layer 3 and the touch electrode layer 2 are electrically connected to each other through the wiring layer 4, and alignment processing is not needed to be performed on conductive materials in the display area A and the wiring area B. In this way, the problems of poor alignment and lapping, increased contact impedance, insufficient adhesive force and the like may be solved.

Figure 3:
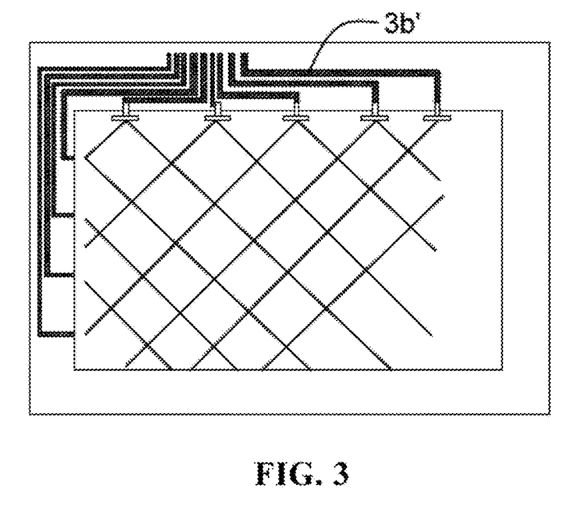
FIG. 3 is a structural diagram of wirings after a conductive layer is processed in an embodiment of the present disclosure.

Compared with the embodiments shown in FIG. 1 to FIG. 3, the touch substrate in the embodiment of the present disclosure also includes the touch electrode structure, the conductive structure and the wiring structure. The difference between the present embodiment and the above embodiments is in that the touch electrode structure has a different specific arrangement. In this embodiment, the sensing electrode and the driving electrode in the touch electrode structure are disposed in a same layer.

Figure 4A:
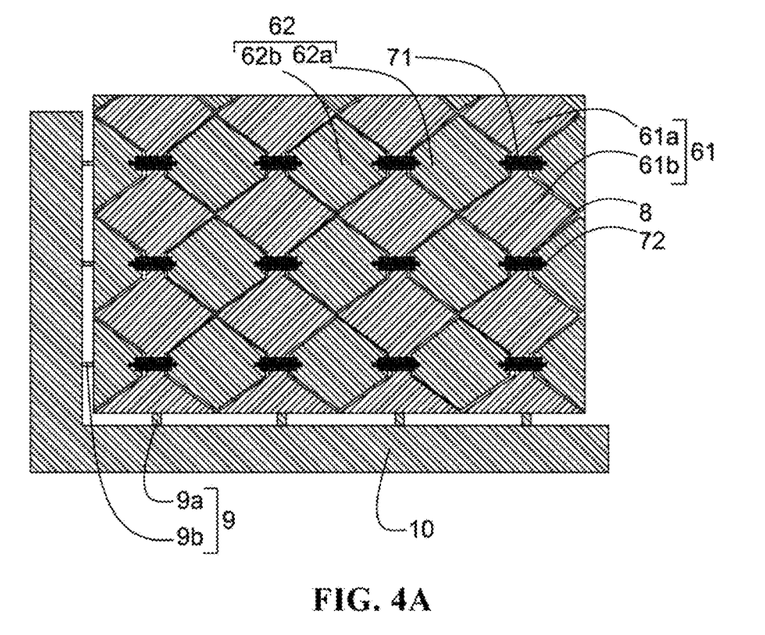
FIG. 4A is a schematic structural diagram of a touch substrate in an embodiment of the present disclosure.
Figure 4B:
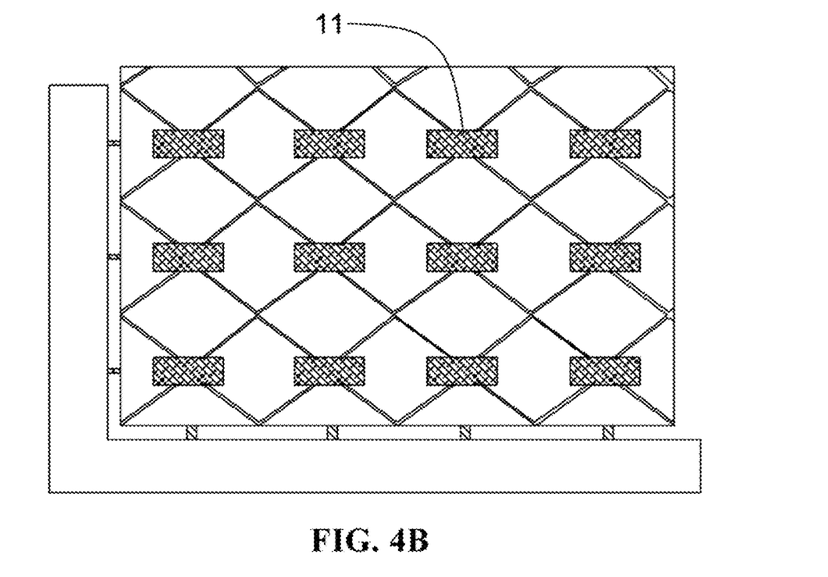
FIG. 4B is a schematic structural diagram of a touch substrate in an embodiment of the present disclosure.

Specifically, referring to FIGS. 4A and 4B, the touch electrode structure includes a plurality of first electrodes 61 and a plurality of second electrodes 62 disposed in a same layer; each first electrode 61 includes a plurality of first electrode units, and every two adjacent first electrode units are 61a and 61b, respectively; each second electrode 62 includes a plurality of second electrode units, and every two adjacent second electrode units are 62a and 62b, respectively; every two adjacent first electrode units 61a and 61b are connected to each other through a first bridging portion 71, so that the first electrode units in a same column are connected in series to form one first electrode; every two adjacent second electrode units 62a and 62b are connected to each other through a second bridging portion 72, so that the second electrode units in a same row are connected in series to form one second electrode; each first bridging portion 71 and the corresponding second bridging portion 72 intersect with each other, and an insulating layer 8 is provided at the intersection between the first bridging portion 71 and the corresponding second bridging portion 72 to insulate the first bridging portion 71 and the corresponding second bridging portion 72 from each other.

The wiring layer 9 includes a plurality of first wirings 9a and a plurality of second wirings 9b; the plurality of first wirings 9a are configured to electrically connect first electrodes 61 to the conductive layer 10; the plurality of second wirings 9b are configured to electrically connect second electrodes 62 to the conductive layer 10.

In this embodiment, as shown in FIG. 4B, the touch substrate further includes a plurality of insulating protection layers 11, and each insulating protection layer 11 at least covers the corresponding first bridging portion 71, the corresponding second bridging portion 72, and the insulating layer 8 between the corresponding first bridging portion 71 and the corresponding second bridging portion 72, so as to insulate and protect these components.

In one embodiment, the plurality of first electrodes 61 and the plurality of second electrodes 62 are, for example, Indium Tin Oxide (ITO) electrodes.

In one embodiment, the conductive layer 10 may include an ITO layer or a nano silver layer.

In the touch substrate in the embodiment, the one-piece layer may be processed to obtain a wiring structure adapted to the needs (meeting the requirements), so that the positions of the wirings may be secondarily adjusted without newly setting up a mask. In this way, the development cost is reduced and the feasibility is improved. In addition, the conductive layer and the touch electrode layer are electrically connected to each other through the wiring layer, and alignment processing is not needed to be performed on conductive materials in the display area and the wiring area. In this way, the problems of poor alignment and lapping, increased contact impedance, insufficient adhesive force and the like may be solved.

Figure 7:
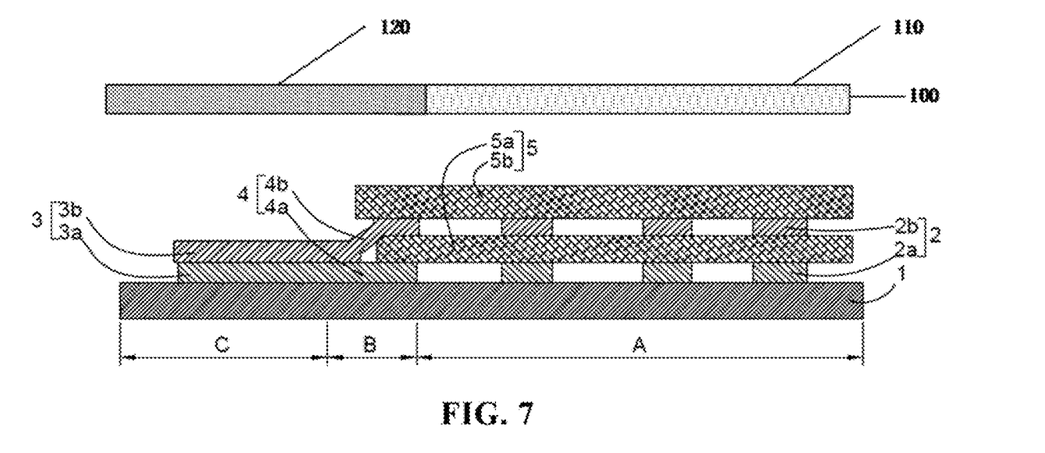
FIG. 7 is a cross-sectional view of a part of a touch substrate in an embodiment of the present disclosure.

In one embodiment, on the basis of the above embodiments, the touch substrate further includes a peelable protection layer 100, as shown in FIG. 7. The peelable protection layer 100 covers the whole area (including the display area A, the wiring area B and the peripheral area C) of the base substrate 1, and is provided on a side of the base substrate 1 where the touch structure 2 is provided, thereby protecting a screen surface of the whole touch substrate. In addition, in one embodiment, the peelable protection layer 100 may adopt a split structure. For example, the peelable protection layer 100 may include a first adhesive segment 110 covering the display area A of the base substrate 1, and a second adhesive segment 120 covering the wiring area B and the peripheral area C of the base substrate 1; the first adhesive segment 110 and the second adhesive segment 120 may be separated from each other. In this way, when an operation is required to be performing on one of the areas, the adhesive segment of the peelable protection layer 100 only in the corresponding one of the areas may be peeled away without affecting the adhesive segments in the other areas. For example, when the conductive structure of the peripheral area C needs to be patterned, only the second adhesive segment 120 of the peelable protection layer 100 may be peeled away to show only the wiring structure and the conductive structure. It should be noted that the peelable protection layer may be one or any combination of a peelable adhesive, a blue film and a process film, may be manufactured by a screen printing process and covers the screen surface.

FIG. 7 is only a schematic diagram showing the position of the peelable protection layer 100 in the present disclosure. In fact, the peelable protection layer 100 is disposed on the surface of the finally formed touch substrate, and other structures, such as a planarization layer or an encapsulation layer, may also be disposed between the peelable protection layer 100 and the touch structure 2, which is not limited in this disclosure.

As another technical solution, an embodiment of the present disclosure further provides a method for manufacturing a touch substrate. By taking the manufacturing of the touch substrate shown in FIG. 1 as an example, the method includes:

forming a touch electrode structure 2 in a display area A of a base substrate 1;

forming a conductive structure 3 in a peripheral area C outside the display area A of the base substrate 1;

forming a wiring structure 4 in a wiring area B of the base substrate 1 between the display area A and the peripheral area C;

wherein the conductive structure 3 is a one-piece layer and is configured to form a lead (such as an external lead) electrically connected to a driving circuit for driving the touch electrode structure 2; the wiring structure 4 is configured to electrically connect the conductive structure 3 to the touch electrode structure 2.

Figure 5:
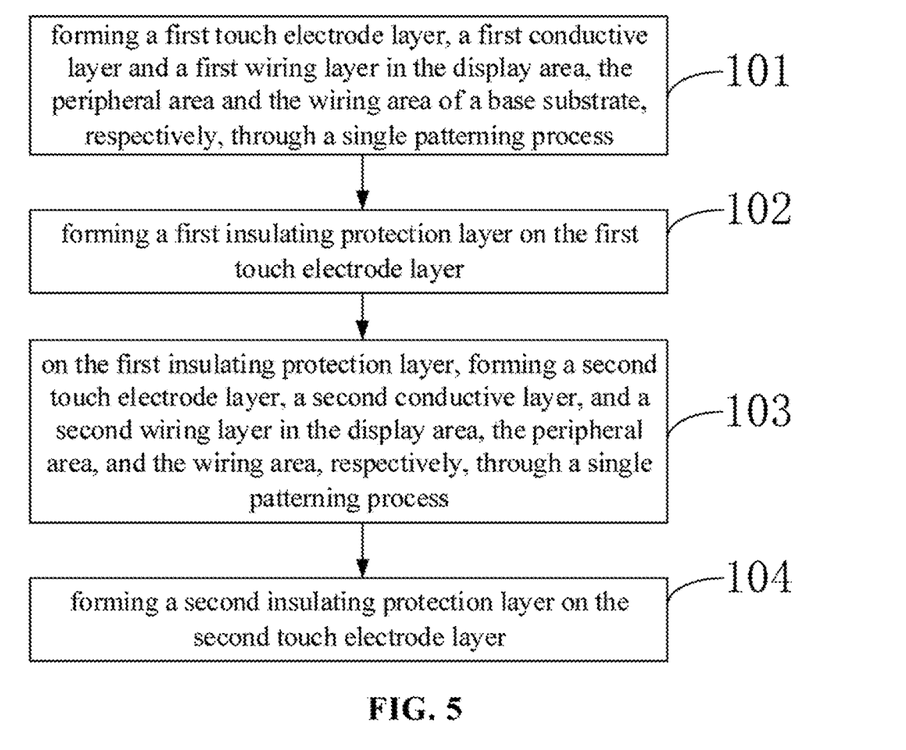
FIG. 5 is a flowchart of a method for manufacturing a touch substrate in an embodiment of the present disclosure.

Specifically, referring to FIG. 5, the method for manufacturing a touch substrate includes:

Step 101, as shown in FIG. 2A, forming a first touch electrode layer 2a, a first conductive layer 3a and a first wiring layer 4a in the display area A, the peripheral area C and the wiring area B of a base substrate 1, respectively, through a single patterning process;

the first wiring layer 4a is configured to electrically connect the first conductive layer 4a to the first touch electrode layer 2a.

In practical applications, the first touch electrode layer 2a, the first conductive layer 3a and the first wiring layer 4a may be simultaneously formed through sputtering, photoresist coating, exposure, etching, and the like.

In one embodiment, the first touch electrode layer 2a is in a mesh shape, and a line width of each electrode line is less than or equal to 15 μm.

Step 102, as shown in FIG. 2B, forming a first insulating protection layer 5a on the first touch electrode layer 2a;

the first insulating protection layer 5a further covers the display area A and a portion of the wiring area B, i.e. the first insulating protection layer 5a further covers a portion of the first wiring layer 4a proximal to the touch electrode structure 2.

Since the first conductive layer 3a is a one-piece layer (e.g., a whole layer without any pattern design), when positions of the PIN outgoing line (e.g., the wirings 3b' shown in FIG. 3) needs to be designed, the one-piece layer may be processed to obtain a lead (e.g., an external lead) adapted to the wiring structure according to actual needs, so that the positions of the wirings may be secondarily designed without newly setting up a mask. In this way, the development cost is reduced and the feasibility is improved. In addition, the first conductive layer and the first touch electrode layer are electrically connected to each other through the first wiring layer, and alignment processing is not needed to be performed on conductive materials in the display area and the wiring area. In this way, the problems of poor alignment and lapping, increased contact impedance, insufficient adhesive force and the like may be solved.

Step 103, as shown in FIG. 2C, on the first insulating protection layer 5a, forming a second touch electrode layer 2b, a second conductive layer 3b, and a second wiring layer 4b in the display area A, the peripheral area C, and the wiring area B, respectively, through a single patterning process.

The second wiring layer 4b is configured to electrically connect the second conductive layer 3b to the second touch electrode layer 2b.

The second touch electrode layer 2b, the second conductive layer 3b and the second wiring layer 4b are formed in a manner similar to that in the above step 101, that is, may be formed simultaneously through sputtering, photoresist coating, exposure, etching, and the like.

In one embodiment, the second touch electrode layer 2b is in a mesh shape, and a line width of each electrode line is less than or equal to 15 µm.

Since the second conductive layer 3b is a one-piece layer (e.g., a whole layer without any pattern design), when positions of the PIN outgoing line (e.g., the wirings 3b' shown in FIG. 3) needs to be adjusted, the one-piece layer may be processed to obtain an external lead adapted to the wiring structure according to actual needs, so that the position of the external lead may be secondarily designed without newly setting up a mask. In this way, the development cost is reduced and the feasibility is improved. In addition, the second conductive layer and the second touch electrode layer are electrically connected to each other through the second wiring layer, and alignment processing is not needed to be performed on conductive materials in the display area and the wiring area. In this way, the problems of poor alignment and lapping, increased contact impedance, insufficient adhesive force and the like may be solved.

Step 104, as shown in FIG. 2D, forming a second insulating protection layer 5b on the second touch electrode layer 2b.

The second insulating protection layer 5b further covers the display area A and a portion of the wiring area B, that is, the second insulating protection layer 5b further covers a portion of the second wiring layer 4b proximal to the touch electrode structure 2.

Figure 6:
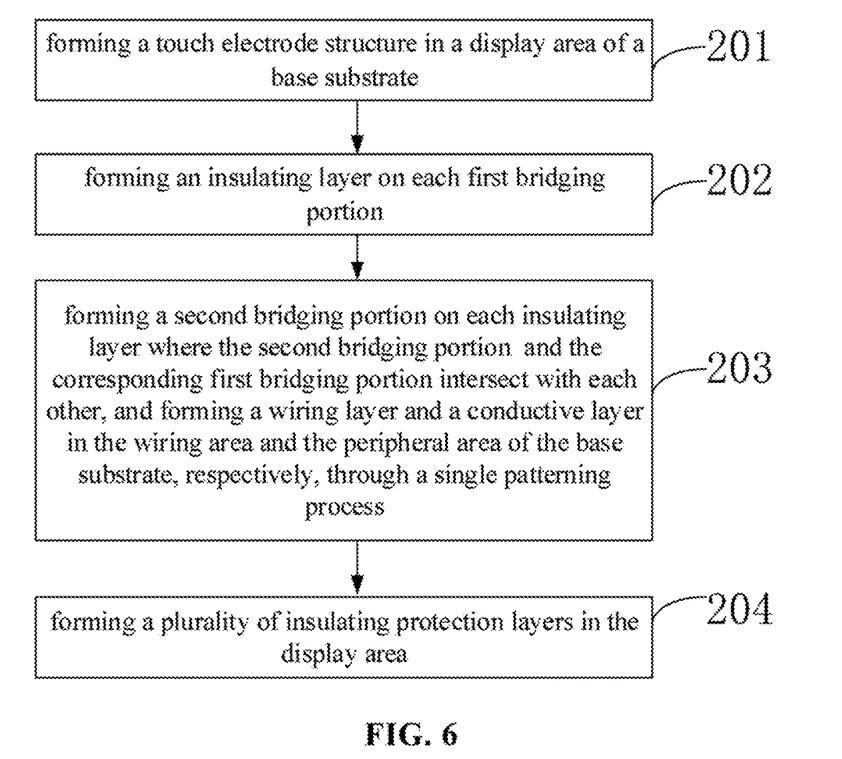
FIG. 6 is a flowchart of a method for manufacturing a touch substrate in an embodiment of the present disclosure.

Referring to FIG. 6, the difference between the manufacturing method of the touch substrate provided in the embodiment of the present disclosure and the above embodiments is only in that the touch electrode structure has a different structure and the method for manufacturing the touch electrode structure is different.

In particular, by taking the manufacturing of the touch substrate shown in FIGS. 4A and 4B as an example, the manufacturing method includes:

Step 201, as shown in FIG. 4A, forming a touch electrode structure in a display area of a base substrate;
wherein the touch electrode structure includes a plurality of first electrodes 61, a plurality of second electrodes 62 and a plurality of first bridging portion 71; the plurality of first electrodes 61 and the plurality of second electrodes 62 are disposed in a same layer; each first electrode 61 includes a plurality of first electrode units, and every two adjacent first electrode units are 61a and 61b, respectively; each second electrode 62 includes a plurality of second electrode units, and every two adjacent second electrode units are 62a and 62b, respectively; every two adjacent first electrode units 61a and 61b are connected to each other through a corresponding first bridging portion 71, so that the first electrode units in a same column are connected in series to form one first electrode 61;

Step 202, as shown in FIG. 4A, forming an insulating layer 8 on each first bridging portion 71;

Step 203, forming a second bridging portion 72 on each insulating layer 8 and at a position where the second bridging portion 71 and the corresponding first bridging portion 72 intersect with each other, and forming a wiring layer 9 serving as the wiring structure and a conductive layer 10 serving as the conductive structure in the wiring area and the peripheral area of the base substrate, through a single patterning process;
wherein each second bridging portion 72 connects two corresponding adjacent second electrode units 62a and 62b, so that the second electrode units in a same row are connected in series to form one second electrode 62. Each insulating layer 8 is provided correspondingly at an intersection between the first bridging portion 71 and the corresponding second bridging portion 72 to insulate the first bridging portion 71 and the corresponding second bridging portion 72 from each other.

The wiring layer 9 includes a plurality of first wirings 9a and a plurality of second wirings 9b; the plurality of first wirings 9a are configured to electrically connect first electrodes 61 to the conductive layer 10; the plurality of second wirings 9b are configured to electrically connect second electrodes 62 to the conductive layer 10.

Step 204, as shown in FIG. 4B, forming a plurality of insulating protection layers 11 in the display area of the base substrate, wherein each insulating protection layer 11 at least covers each corresponding first bridging portion 71, each corresponding second bridging portion 72, and the insulating layer 8 between the first bridging portion 71 and the second bridging portion 72.

Since the conductive layer 10 is a one-piece layer (e.g., a whole layer without any pattern design), when positions of the PIN outgoing line needs to be adjusted, the one-piece layer may be processed to obtain an external lead adapted to the wiring structure according to actual needs, so that the position of the external lead may be secondarily designed without newly setting up a mask. In this way, the development cost is reduced and the feasibility is improved. In addition, the conductive layer and the touch electrode layer are electrically connected to each other through the second wiring layer, and alignment processing is not needed to be performed on conductive materials in the display area and the wiring area. In this way, the problems of poor alignment and lapping, increased contact impedance, insufficient adhesive force and the like may be solved.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A touch substrate, comprising a base substrate and a touch electrode structure in a display area of the base substrate, wherein
the touch substrate further comprises a conductive structure and a wiring structure, wherein the conductive structure is in a peripheral area of the base substrate outside the display area, and comprises at least one conductive layer, and the at least one conductive layer comprises a one-piece layer of a whole layer without any pattern design, which is configured to be intended to form a lead electrically connected to a driving circuit for the touch electrode structure; and
the wiring structure is in a wiring area between the display area and the peripheral area of the base substrate and is configured to electrically connect the conductive structure to the touch electrode structure.

2. The touch substrate of claim 1, wherein
the touch electrode structure comprises a first touch electrode layer and a second touch electrode layer sequentially arranged along a direction away from the base substrate;
the touch substrate further comprises a first insulating protection layer and a second insulating protection layer, the first insulating protection layer is between the first touch electrode layer and the second touch electrode layer, the second insulating protection layer is on the second touch electrode layer, and the first insulating protection layer and the second insulating protection layer are in the display area and a part of the wiring area;
the at least one conductive layer comprises a first conductive layer and a second conductive layer which are sequentially stacked along the direction away from the base substrate, wherein at least one of the first conductive layer and the second conductive layer is the one-piece layer; and
the wiring structure comprises a first wiring layer and a second wiring layer sequentially arranged along the direction away from the base substrate, and the first wiring layer is on the base substrate and is configured to electrically connect the first conductive layer to the first touch electrode layer; the second wiring layer is on the first insulating protection layer and is configured to electrically connect the second conductive layer to the second touch electrode layer.

3. The touch substrate of claim 2, wherein the first touch electrode layer and the second touch electrode layer are both in a mesh shape.

4. The touch substrate of claim 2, wherein the first conductive layer and/or the second conductive layer comprises an indium tin oxide layer or a nano silver layer.

5. The touch substrate of claim 1, wherein
the at least one conductive layer comprises a conductive layer which is the one-piece layer;
the touch electrode structure comprises a plurality of first electrodes and a plurality of second electrodes; each of the plurality of first electrodes comprises a plurality of first electrode units; each of the plurality of second electrodes comprises a plurality of second electrode units; every two adjacent first electrode units are connected to each other through a first bridging portion; every two adjacent second electrode units are connected to each other through a second bridging portion; each first bridging portion and a corresponding second bridging portion intersect with each other, and the touch electrode structure further comprises an insulating layer at an intersection between the first bridging portion and the corresponding second bridging portion;
the wiring structure comprises a plurality of first wirings and a plurality of second wirings, wherein the plurality of first wirings are configured to electrically connect the plurality of first electrodes to the conductive layer, respectively; the plurality of second wires are configured to electrically connect the plurality of second electrodes to the conductive layer, respectively; and
the touch substrate further comprises a plurality of insulating protection layers, and each of the plurality of insulating protection layers at least covers a corresponding first bridging portion, a corresponding second bridging portion and the insulating layer between the corresponding first bridging portion and the corresponding second bridging portion.

6. The touch substrate of claim 5, wherein the conductive layer comprises an indium tin oxide layer or a nano silver layer.

7. The touch substrate of claim 1, further comprising a peelable protection layer covering the display area, the peripheral area, and the wiring area of the base substrate and on a side of the base substrate with the touch electrode structure.

8. The touch substrate of claim 7, wherein the peelable protection layer comprises a first adhesive segment covering the display area of the base substrate and a second adhesive segment covering the wiring area and the peripheral area of the base substrate; the first adhesive segment and the second adhesive segment are separated from each other.

9. A method for manufacturing a touch substrate, comprising:
forming a touch electrode structure in a display area of a base substrate;
forming a conductive structure in a peripheral area outside the display area of the base substrate; and
forming a wiring structure in a wiring area of the base substrate between the display area and the peripheral area;
wherein the conductive structure comprises at least one conductive layer, the at least one conductive layer comprises a one-piece layer of a whole layer without any pattern design, which is configured to be intended to form a lead electrically connected to a driving circuit for the touch electrode structure; the wiring structure is configured to electrically connect the conductive structure to the touch electrode structure.

10. The method of claim 9, comprising:
forming a first touch electrode layer, a first conductive layer and a first wiring layer in the display area, the peripheral area and the wiring area of the base substrate, respectively, through a single patterning process, such that the first wiring layer is configured to electrically connect the first conductive layer to the first touch electrode layer;
forming a first insulating protection layer on the first touch electrode layer such that the first insulating protection layer covers the display area and a part of the wiring area;
on the first insulating protection layer, forming a second touch electrode layer, a second conductive layer and a second wiring layer in the display area, the peripheral area and the wiring area, respectively, through a single patterning process, such that the second wiring layer is configured to electrically connect the second conductive layer to the second touch electrode layer;
forming a second insulating protection layer on the second touch electrode layer such that the second insulating protection layer covers the display area and a part of the wiring area,
wherein the first touch electrode layer and the second touch electrode layer form the touch electrode structure, the first conductive layer and the second conductive layer form the conductive structure, and the first wiring layer and the second wiring layer form the wiring structure; and
at least one of the first and second conductive layers is the one-piece layer.

11. The method of claim 10, wherein the first conductive layer and/or the second conductive layer comprises an indium tin oxide layer or a nano silver layer.

12. The method of claim 9, comprising:
forming a touch electrode layer in the display area of the base substrate, wherein the touch electrode layer comprises a plurality of first electrodes, a plurality of second electrodes and a plurality of first bridging portion; wherein each of the plurality of first electrodes comprises a plurality of first electrode units; each of the plurality of second electrodes comprises a plurality of second electrode units; every two adjacent first electrode units are connected to each other through a corresponding first bridging portion;
forming an insulating layer on each of the plurality of first bridging portions;
forming a second bridging portion on the insulating layer where the second bridging portion and the corresponding first bridging portion intersect with each other, and forming a wiring layer and a conductive layer in the wiring area and the peripheral area of the base substrate, respectively, through a single patterning process; wherein the second bridging portion connects two corresponding adjacent second electrode units together; the wiring layer comprises a plurality of first wirings and a plurality of second wirings, and the plurality of first wirings are configured to electrically connect the plurality of first electrodes to the conductive layer, respectively; the plurality of second wirings are configured to electrically connect the plurality of second electrodes to the conductive layer, respectively;
forming a plurality of insulating protection layers in the display area of the base substrate such that each of the plurality of insulating protection layers at least covers a corresponding first bridging portion, a corresponding second bridging portion and the insulating layer between the corresponding first bridging portion and the corresponding second bridging portion,
wherein the touch electrode layer forms the touch electrode structure, the conductive layer forms the conductive structure, and the wiring layer forms the wiring structure; and
the conductive layer is the one-piece layer.

13. The method of claim 12, wherein the plurality of first electrodes and the plurality of second electrodes are in a same layer.

14. The method of claim 9, further comprising forming a peelable protection layer in the display area, the peripheral area, and the wiring area of the base substrate and on a side of the base substrate where the touch electrode structure is provided.

15. The method of claim 14, wherein the peelable protection layer comprises a first adhesive segment covering the display area of the base substrate and a second adhesive segment covering the wiring area and the peripheral area of the base substrate; the first adhesive segment and the second adhesive segment are separated from each other.

16. The touch substrate of claim 3, wherein the first conductive layer and/or the second conductive layer comprises an indium tin oxide layer or a nano silver layer.

17. The touch substrate of claim 2, further comprising a peelable protection layer covering the display area, the peripheral area, and the wiring area of the base substrate and on a side of the base substrate with the touch electrode structure.

18. The touch substrate of claim 3, further comprising a peelable protection layer covering the display area, the peripheral area, and the wiring area of the base substrate and on a side of the base substrate with the touch electrode structure.

19. The touch substrate of claim 4, further comprising a peelable protection layer covering the display area, the peripheral area, and the wiring area of the base substrate and on a side of the base substrate with the touch electrode structure.

20. The touch substrate of claim 5, further comprising a peelable protection layer covering the display area, the peripheral area, and the wiring area of the base substrate and on a side of the base substrate with the touch electrode structure.

* * * * *